UNITED STATES PATENT OFFICE.

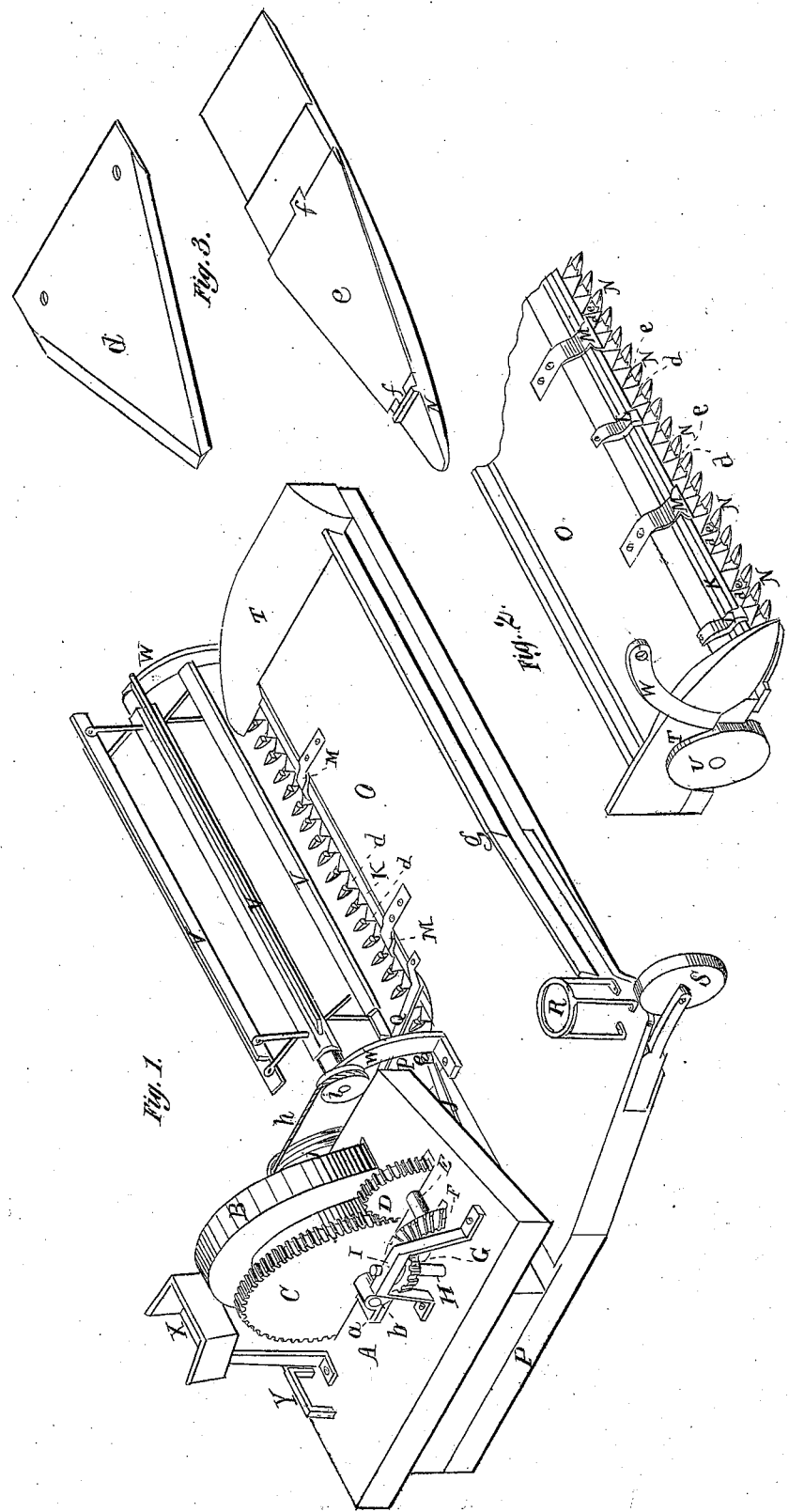

PLINY THAYER, OF LANSINGBURG, NEW YORK.

IMPROVEMENT IN HARVESTER-CUTTERS.

Specification forming part of Letters Patent No. 14,422, dated March 11, 1856.

*To all whom it may concern:*

Be it known that I, PLINY THAYER, of Lansingburg, in the county of Rensselaer and State of New York, have invented certain new and useful Improvements in Grain and Grass Harvesters; and I do hereby declare the following to be a full, clear, and exact description of the same, reference being had to the accompanying drawings, making a part thereof, in which—

Figure 1 represents a perspective view of the machine, taken from the rear left-hand corner thereof. Fig. 2 represents a perspective of the platform and cutting apparatus from the front, and Fig. 3 represents portions of one of the fingers.

Similar letters, where they occur in the several figures, denote like parts in all.

The nature of my invention relates to the particular manner in which I have arranged the cutting parts of a grain or grass harvester, with a view of simplifying and cheapening its construction, but to preserve its efficiency.

To enable others skilled in the art to make and use my invention, I will proceed to describe the same with reference to the drawings.

A represents a stout frame, which may be made of a single plank in suitable bearings, $a$, on which the journals $b$ of the main driving and supporting wheel B are supported.

Connected with the supporting-wheel B is a cogged wheel, C, which meshes with a pinion, D, on a shaft, E, which has its bearings also on the frame A. On the end of the shaft E is a bevel-gear wheel, F, which takes into and gives motion to the bevel-gear G on the vertical shaft H, the upper end of said shaft H being supported in the pillow-block I, also on the frame A.

J is a pitman or connecting-rod, one end of which is connected to a crank on the lower end of the vertical shaft H, and the other end attached at $c$ to the cutter-bar K, for the purpose of vibrating said bar and the cutters $d$ upon it. The cutter-bar K vibrates through the guides L, and intermediately between said guides are placed yielding or spring holders M, which extend beyond the bar K and press upon the cutters $d$ to hold them against the stationary cutter-plates $e$, which lie in the fingers or guards N. The guards N are not capped, and consequently do not subject the cutters to clogging. The springs and guides are sufficient to hold the cutters in close contact with each other without leaving any unnecessary rubbing-surfaces where the gum, &c., accumulates and chokes up their free action. The plates $e$, which lie on the upper side of the guards or fingers N, have projections $f\,f$ on their front and rear ends, which fit into recesses or countersinks in the guards or fingers, and are thus held in their places horizontally, while the cutters above them, through their guides and springs, prevent them from rising from their seats, and they are thus easily removed to be resharpened, and as readily replaced again.

O is the platform, attached to the frame A by the pieces P and braced by a brace, Q, extending from the platform obliquely to the frame A. On the rear left-hand corner of the platform is the raker's stand R, and behind it a supporting-wheel, S. On the outer end of the platform—viz, that end which runs next the standing grain—is placed the usual dividing-board, T, and also a supporting-wheel, U. It will be perceived that the platform O extends from outside to outside of the machine, but not in a direct line, an angle being made at $g$, from which point the platform inclines backward toward the delivering part of the platform. This rearward inclination of the platform enables the raker from his stand to rake off the grain with the natural sweep of his arms or body, and greatly relieves him of his laborious duty.

The reel V is supported in the bearers W, and is driven by a band, $h$, passing around a pulley, $i$, on the reel-shaft, and around a pulley, $j$, on the shaft $b$ of the supporting-wheel B.

X is the driver's seat, and Y the staple through which the tongue to which the horses are hitched may pass.

The machine as described is arranged for reaping, but when used for mowing grass may have its platform, reel, and other parts not used in mowing removable or removed.

Having thus fully described the nature of my invention, what I claim therein as new, and desire to secure by Letters Patent, is—

In combination with the plates $e$, lying loosely on the fingers or guards, but kept from moving by the projections $f\,f$ on the plates and the open countersinks on the guards, the cutters $d$, which are vibrated past those $e$, and held to them by the guides and springs L M, substantially as described.

PLINY THAYER.

Witnesses:
I. RANSOM,
C. P. DAVENPORT.